United States Patent [19]

Balasubramanian

[11] Patent Number: 4,636,069

[45] Date of Patent: Jan. 13, 1987

[54] METHOD FOR READING DEFORMATION IMAGES ON ELECTROPHOTOGRAPHIC MEDIA

[75] Inventor: N. Balasubramanian, Saratoga, Calif.

[73] Assignee: Matrix Instruments Inc., Orangeburg, N.Y.

[21] Appl. No.: 672,597

[22] Filed: Nov. 15, 1984

[51] Int. Cl.$^4$ .................. G01B 11/24; H04N 3/08
[52] U.S. Cl. .................................... 356/71; 356/376; 358/111
[58] Field of Search .................... 356/71, 376–377; 350/6.4; 378/28, 29, 32; 358/300, 111

[56] References Cited

U.S. PATENT DOCUMENTS

| 4,336,998 | 6/1982 | Ruell ................................. 356/71 |
| 4,398,787 | 8/1983 | Balasubramanian ................ 350/6.4 |
| 4,521,808 | 6/1985 | Ong et al. ......................... 378/29 X |

OTHER PUBLICATIONS

Brochure, "Model 1000B–Automated Wavefront Measurement System", by Digital Optics Corporation, 1030D East Duane Ave., Sunnyvale, CA 94086.

Primary Examiner—Vincent P. McGraw
Attorney, Agent, or Firm—Thomas Schneck

[57] ABSTRACT

A method for reading deformation images recorded on electrophotographic media involving scanning of an image surface and measuring microscopic surface tilt in a reflected beam. In one embodiment, the deformation image is scanned telecentrically and in another embodiment the surface is scanned with a beam at angles to the surface. By intercepting the retroflected beam and measuring the deviation of the reflected beam from the scanning center, a number of proportional-to-surface tilt is found. By then electrically integrating over neighboring regions, an electrical or optical pattern, reimaging the deformation image, may be constructed.

10 Claims, 12 Drawing Figures

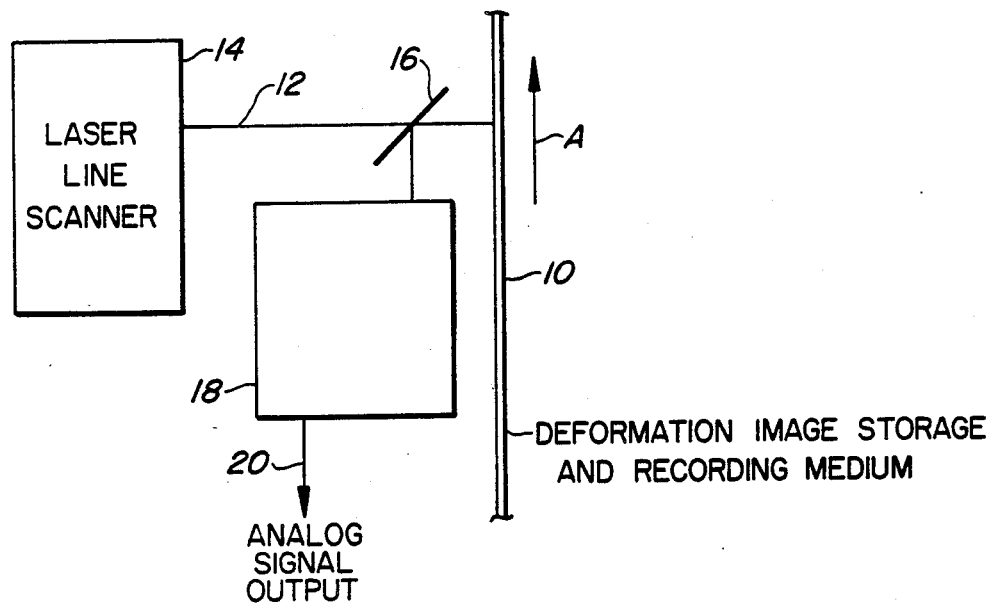
FIG._1.
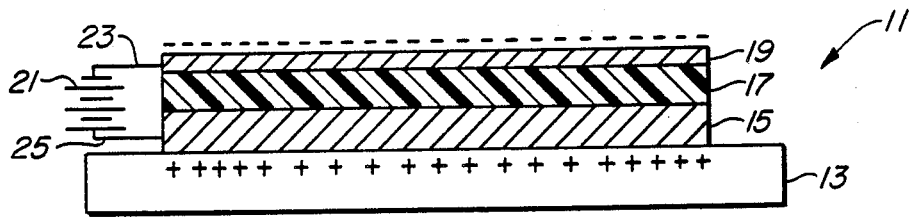
FIG._2.
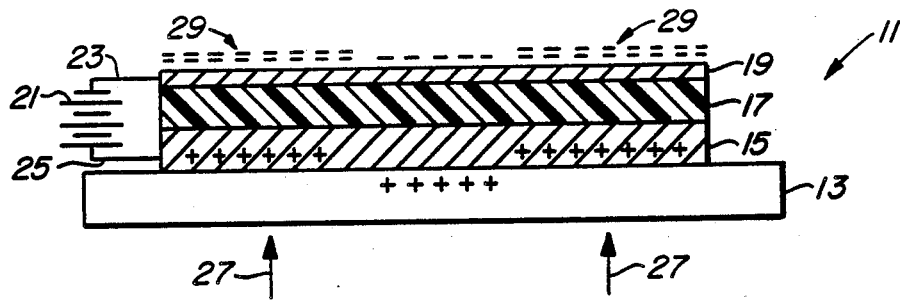
FIG._3.
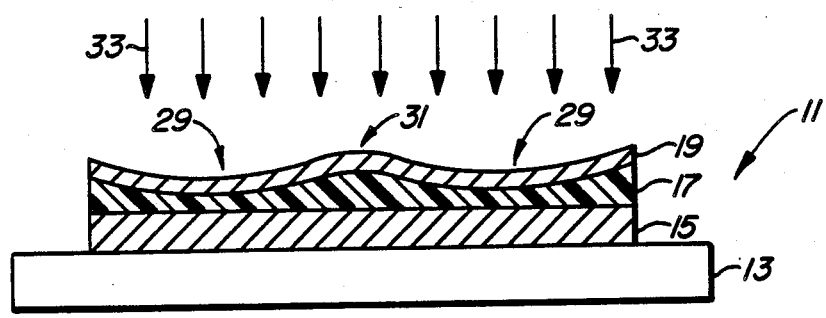
FIG._4.

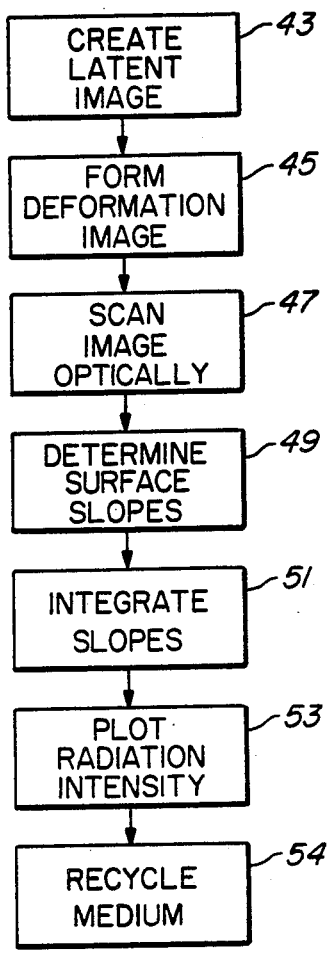
FIG._5.
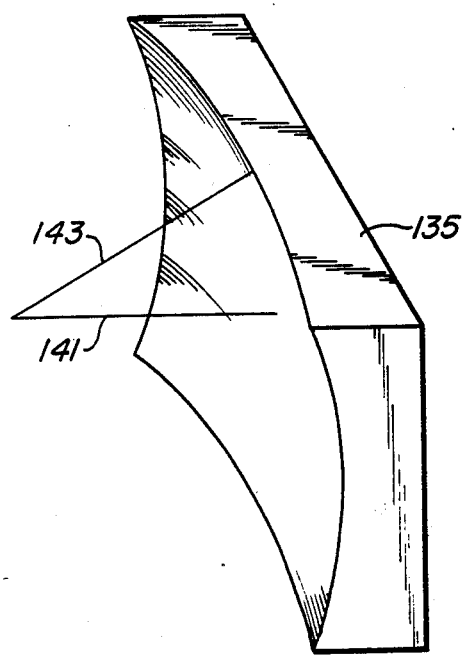
FIG._9.
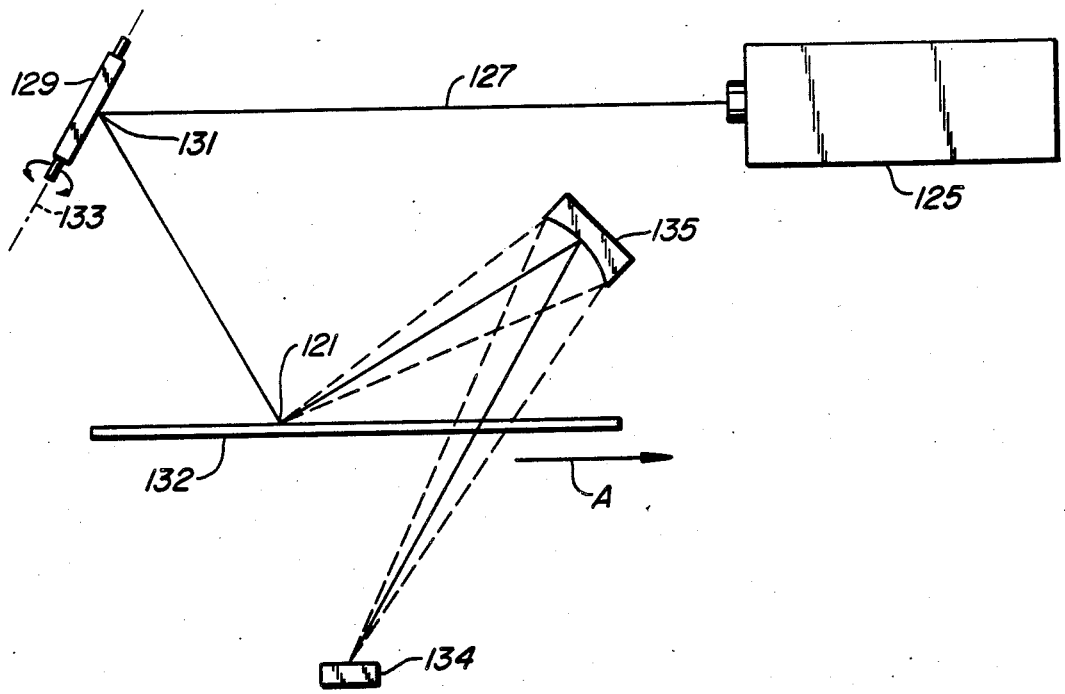
FIG._8.

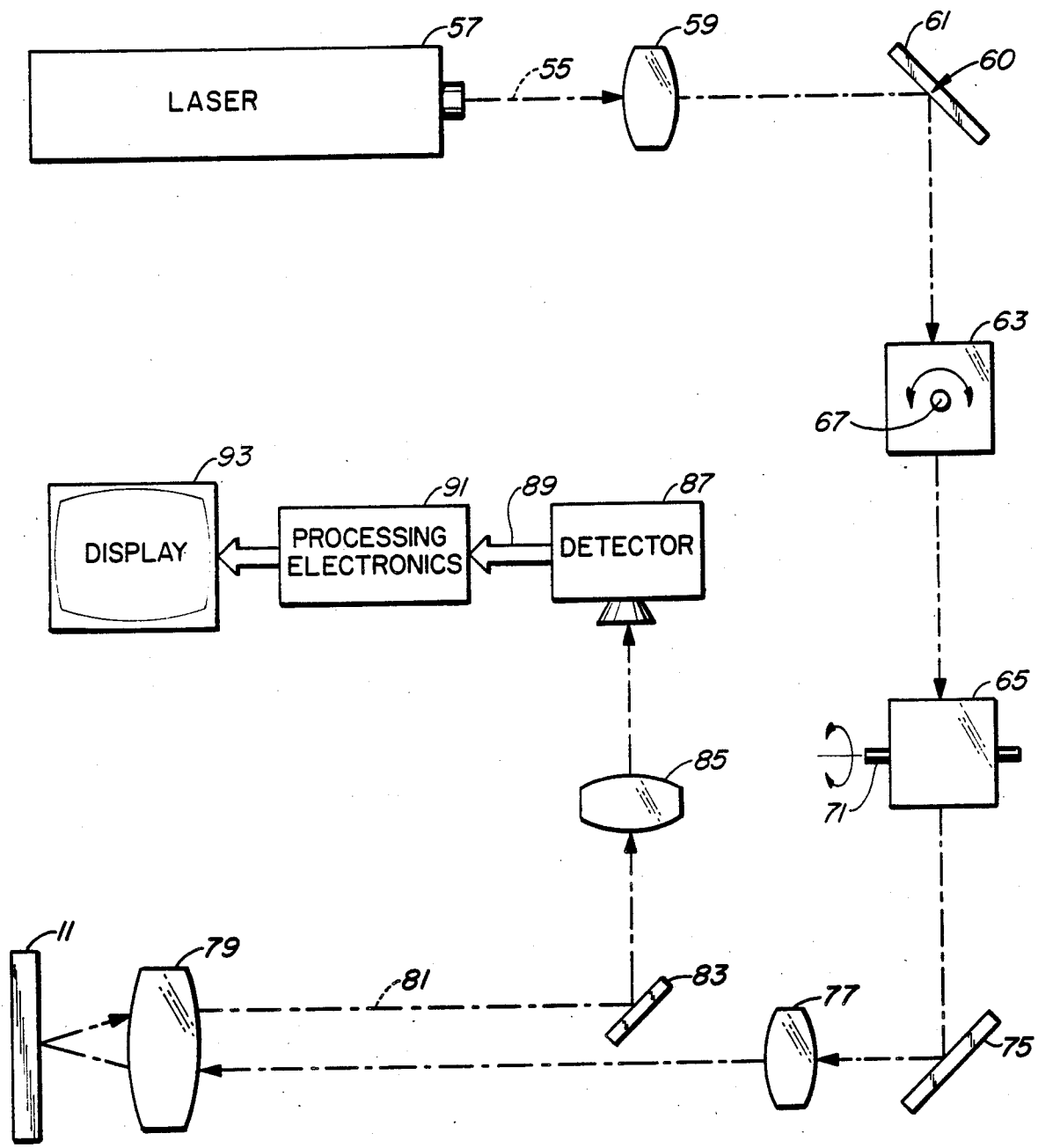
FIG._6.

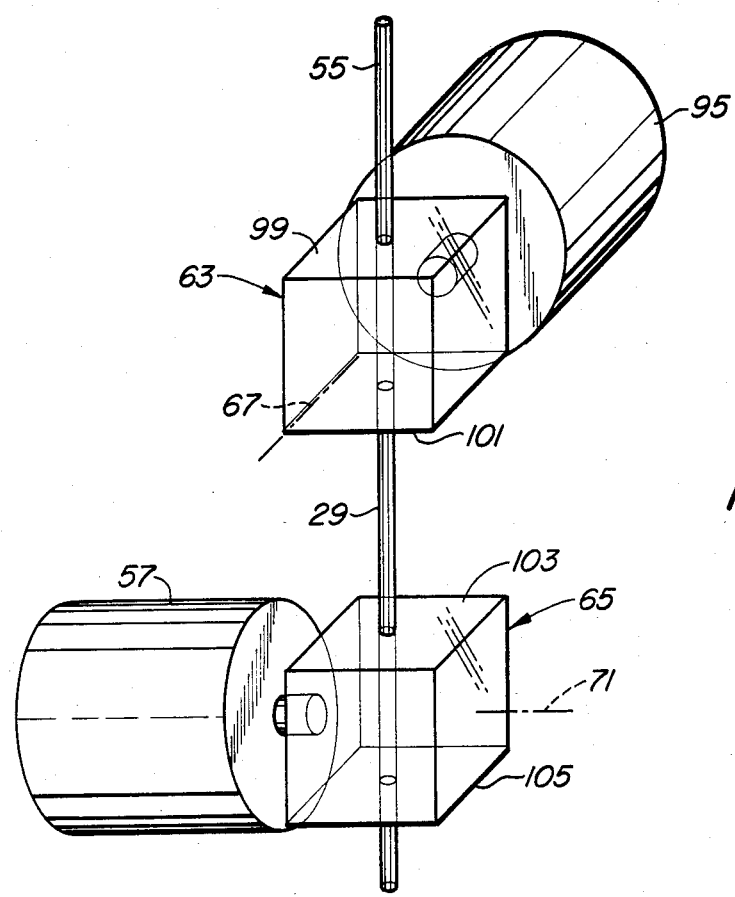
FIG._7.
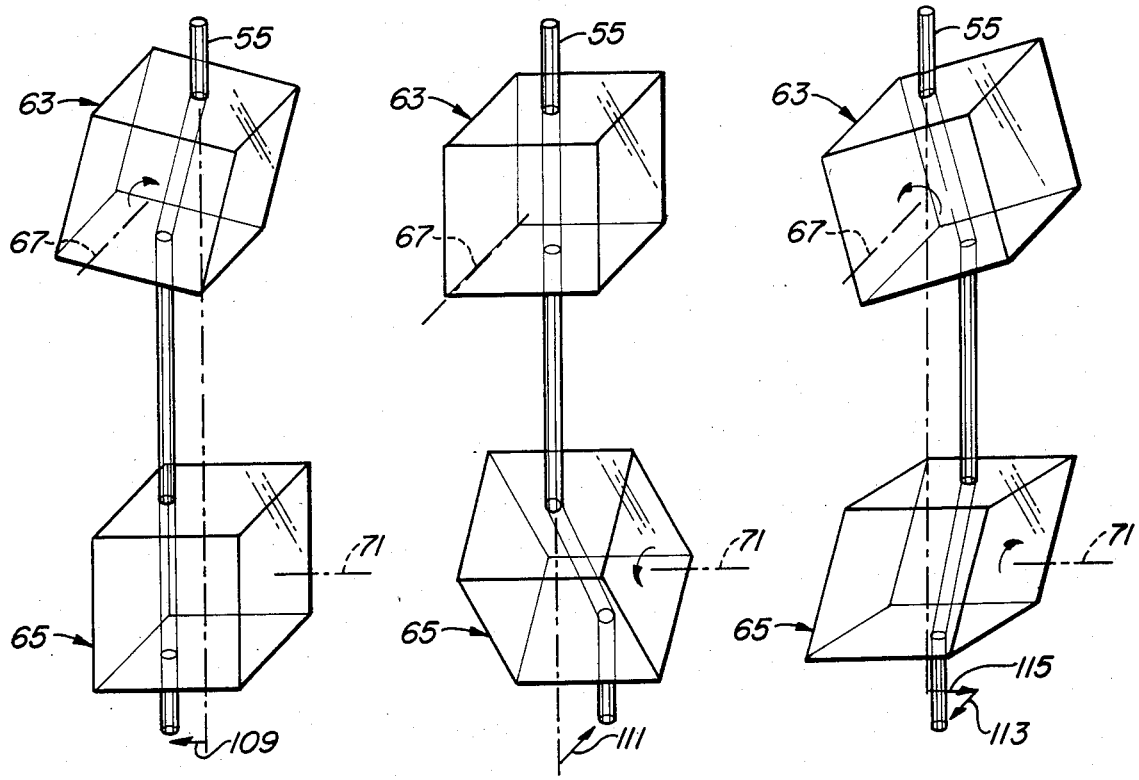
FIG._7A.  FIG._7B.  FIG._7C.

METHOD FOR READING DEFORMATION IMAGES ON ELECTROPHOTOGRAPHIC MEDIA

DESCRIPTION

1. Technical Field

The invention relates to a method of directly displaying or digitizing an image formed on a sheet of electrophotographic material.

2. Background Art

Electrophotographic imaging and image transfer have been developed over the past 40 years. Xerography and photocopiers have made electrophotography common in our day-to-day experience. Xeroradiography, applied to mammography, has extended the application to medical imaging as well.

Electrophotography has been combined with surface deformation imaging techniques and reusable image sensors have been developed for reading electrophotographic media having surface deformations. One reading method, involving Schlieren optics is described in U.S. Pat. No. 4,029,960. Another reading technique involving an electrometer is described in the report "Preliminary Experience with a Charged Selenium Plate Projection X-ray System", by P. J. Papin, et al., SPIE, vol. 454 p. 265-270 (1984).

While prior art systems have had some success, there is a need for an improved signal-to-noise ratio and improved dynamic range for the final image.

Over the past few years, there have been efforts to develop image sensors for X-ray film whereby images are digitized for archival storage and subsequent display. The replacement of silver-based film with other archival media, especially digital media, is seen to present a number of advantages. Electrophotographic media has been recognized by others as an ideal candidate for digital archival storage and retrieval. However, the effort to develop sensors for reading the media has met with only limited success.

An object of the invention was to provide a method and apparatus for digitizing deformation images formed on electrophotographic media.

SUMMARY OF INVENTION

The above object has been achieved by reading electrophotographic deformation images by a direct measurement approach, as opposed to indirect approaches of the prior art, such as Schlieren imaging systems which measure phase contrast. The present invention measures the extent of tilt or slope from microscopic areas of a deformation image. The system works as follows.

First, an image is captured on a surface-deformation medium, such as elastomer-coated selenium or photoplastic material, in the usual way. Then the deformation image is scanned with a beam. An optical detector measures the extent of tilt from microscopic areas of the reflective image surface. The tilt or slope of the microscopic reflective regions indicates the rate of change of radiation intensity recorded on the medium. Next, the optical signal from the optical detector is converted to a corresponding electrical signal. This signal is passed through an electrical integrator and the resultant signal represents radiation intensity at the microscopic region from whence the reflected optical signal came. This radiation intensity signal may be directly displayed or digitized and stored.

BRIEF DESCRIPTION OF THE DRAWINGS

FIG. 1 is a plan view of an image digitizing system in accord with the present invention.

FIG. 2 is a side plan view of an unexposed deformation imaging medium under the influence of an electric field.

FIG. 3 is a view of the medium of FIG. 2, having been imagewise exposed to X-rays to create a latent image charge pattern.

FIG. 4 is a view of the medium of FIG. 3, having been heated to develop the latent image charge pattern into a deformation image.

FIG. 5 is a flow chart of steps used in the method of the present invention.

FIG. 6 is a plan view of an optical scanning apparatus used in the method of the present invention.

FIGS. 7 and 7a-7c are isometric plan views of the scanning apparatus used in FIG. 5.

FIG. 8 is a plan view of an alternate optical scanning apparatus used in the method of the present invention.

FIG. 9 is a perspective view of a toric mirror for use with the scanning apparatus of FIG. 8.

BEST MODE FOR CARRYING OUT THE INVENTION

With reference to FIG. 1, a system for reading an imagewise contoured deformation image is shown. The deformation image 10 moves in the direction indicated by the arrow A. Such motion may be either by means of a transport, drum or carriage. As the film moves slowly, a beam 12 generated by a laser line scanner 14 sweeps across the medium in a horizontal line. The beam 12 passes through the half-silvered mirror 16. Some of the light directed onto the medium is retroreflected from the medium onto mirror 16 and thence to light collection optics and detector 18 which detects the slope of the retroreflected beam in accord with the method of the present invention. The degree of slope is an analog output signal taken along line 20. This signal may be converted in an analog-to-digital converter, not shown, for a digital representation of the slope in the deformation image. The extent of slope is linearly proportional to the intensity of radiation creating the deformation over a wide dynamic range.

With reference to FIG. 2, an exemplary electrophotographic medium is shown. Many varieties of deformation media are available and the illustration of one deformation medium is not intended to limit applicability of the invention to such a medium. Photoplastic medium 11 has a substrate 13 which is flat and may be either a dielectric, such as glass, or a conductor, such as aluminum. On the substrate, a thin photoconductive plate, preferably selenium, 15, is deposited. The selenium plate is actually a thin film of selenium, similar to drum material used in xerography. The photoconductor 15, which is flat, having upper and lower planar surfaces, is coated with a thin thermoplastic or elastomeric coating 17, which is also flat. Photoconductive material described thus far can be purchased commercially. The coating 17 should be uniform and generally flat and parallel to photoconductive layer 15. Atop coating 17, a thin metal layer 19 is deposited. This metal layer may be vapor deposited or otherwise applied such that it is in intimate contact with coating 17. The material may have an optical reflectivity of at least 20% and preferably greater than 50% for reflective reading. Alternatively, the medium may be read by transmission of refracted light through the medium if a transparent substrate is used. The purpose of the material is for the application of an electrostatic charge to the coating 17, as well as for reflecting light in subsequent steps. Electric potential is applied by connecting one terminal 23 in contact with thin metal layer 19 and an opposite terminal 25 in contact with photoconductor 15 so that an electric field exists therebetween. If a metal substrate 13 or a similar underlayer beneath photoconductor 15 is employed, terminal 25 can be directly connected to the metal substrate. In the case where a dielectric substrate is used, terminal 25 should be connected to the photoconductor 15.

An imagewise exposure of a target is captured on the recording medium, in the usual way. In other words, the recording medium 11 of the present invention is used as a substitute for photographic film and screen combination. With reference to FIG. 3, radiation impinging on the medium 11 causes an imagewise charge distribution which, while uniform in FIG. 1, is now non-uniform. More particularly, an actinic radiation exposure, symbolized by arrows 27, causes charge redistribution, with an increased charge density in regions 29 where radiation impinged. Note that terminals 23 and 25, connected to a charge source, are still connected. In thermoplastic recording media, the accumulation of charge corresponds to the exposed image in an analogous way to the creation of a latent image in photographic film. The thermoplastic recording medium image is often developed and fixed by heating it. An elastomer recording medium requires no development or fixing.

FIG. 4 shows the formation of a deformation image in the medium 11 wherein the coating 17 has deformed, by slumping upon heating to a material flow temperature, in proportion to electrostatic forces influencing its surface. Greatest deformation occurs in regions 29 where there was an excess amount of charge the virtually no deformation occurs in central region 31 where there was no radiation impingement. Photoconductive layer 15 remains essentially flat as does the substrate 13. The very thin metal layer 19 follows the contours of the coating 17 since it is in intimate contact therewith. To read the thermoplastic material, it is necessary to direct light, indicated by arrows 33, onto the deformation image to sense the deformations.

The process of the present invention is summarized in FIG. 5. First, a deformation image is created, such as by use of a thermoplastic recording medium of any suitable type. This is indicated by blocks 43 and 44, representing imagewise exposure of the deformation medium to actinic radiation and fixing of the image by heating or other fixing step. The medium itself may be transmissive, only partially reflective, as previously described, or it may be made reflective by adding a reflective coating. If a thin metal layer is sputtered onto the thermoplastic recording medium in advance, the thin coating serves the additional purpose of assisting in charging the medium as indicated in FIG. 1.

Next, the reflective image is scanned with a beam so that local tilt or slope can be detected. Preferably, scanning is line scanning by means of a laser having a sharply focused beam. This is indicated by block 47. A portion of the beam which is rearwardly reflected from the deformation image will come back at an angle depending upon the surface tilt, which in turn is proportional to the amount of radiation impinging on the surface at the location corresponding to the tilted surface region. Tilt is determined by a position sensing detector of the type which produces an electrical signal, corresponding to the position of a beam on the area of a planar detector. The detector, operating like an electrical resistive bridge senses the x and y coordinates, relative to the center of the detector. The detector is typically made of silicon and exhibits the photo-voltaic effect. Photo currents produced in the detector are detected by electrodes at the edges such that the photo current forms a resistive divider between the electrodes with the location of the impinging laser determined by the proportional location of the photo current between electrodes. This is done in X and Y directions such that the coordinates of the impinging beam are determined. In order to image the reflected beam onto the detector, a beam splitter is used to deflect light reflected from the deformation image. The position of the centroid of the retroreflected image of the scanned center is directly proportional to the tilt of the test surface at the point of measurement. A large number of measurements are made, so that many microscopically adjacent readings can be compared. The readings are indicated by block 49. As an electical signal, the local slope may be integrated over an area to determine the deformation and therefore the intensity. Deformation can then be translated and plotted as radiation intensity, indicated by block 53. Lastly, thermoplastic deformation media may be reused by heating the material uniformly in the absence of charge to a plasticizing or material flow temperature. This causes slumping of the material across the entire surface, indicated in block 54. Elastomeric media may be reused by removal of deposited electrostatic charge.

A first optical arrangement of components is described in U.S. Pat. No. 4,398,787, to Balasubramanian, for "Optical Leverage Telecentric Scanning Apparatus". In telecentric scanning the beam is kept perpendicular to the scanned surface. The position of the retroreflected image of the scan center is directly proportional to the slope or tilt of the scanned surface at the point of measurement. In the aforementioned U.S. Pat. No. 4,398,787 a pair of refractive plates or prisms is used as the beam scanner. The prisms are described with reference to FIG. 6.

In order to allow better control of light beam 55, and to have a strong signal at the detector, it is preferred that the beam be coherent. A laser beam is generated by laser 57. Beam 55 is shaped by a first lens 59 and is imaged onto a spot on the mirror 61. The spot, 60, appears as the scanning center of the beam.

The incident beam direction is therefore a reference position for measuring slope rate. From mirror 61, the beam is directed to a first prism 63 and then to a second prism 65. First prism 63 is caused to rotate about an axis 67 deflecting the beam in a direction in the surface of the paper. The beam, indicated by phantom lines, is then incident on second prism 65 which is caused to rotate about an axis 71 to move the exiting beam in a direction perpendicular to the paper. The beam is then reflected by a mirror 75 onto optical elements 77 and 79, shaping the beam into the desired size for incidence on the recording material 11. The image deformation medium reflects light since it contains an imagewise deformation pattern and the reflected beam 81 is directed by mirror 83 and lens 85 onto detector 87 which is a position-sensitive detector of the type previously mentioned. Such detectors are manufactured by Hamamatsu and their operation described in Hamamatsu Technical Note TN-102, January, 1982. The analog signal 89 representing position of the retroreflected beam centroid is then integrated in an electrical integrator within processing electronics 91. The integrated signal may be converted, plotted or otherwise displayed in display device 93, or stored for future use.

FIG. 7, showing details of the scanning mechanism, indicates that prism 63 is rotated about its axis 67 by an appropriate small motor 95. Similarly, the second prism 65 is rotated about its axis 71 by a small motor 57. The axes 67 and 71 are oriented substantially perpendicular to each other when viewed along the length of the incident beam, thereby moving the beam in two directions perpendicular to each other. Each prism has a pair of substantially parallel planar surfaces, as would occur on a cube, the light beam entering the prism through one surface and exiting through the other. For prism 63 these parallel surfaces are 99 and 101. For the prism 65, there are surfaces 103 and 105. Each prism is held so that its respective axis of rotation extends between opposing parallel surfaces and is itself parallel to them as equidistant between them.

FIG. 7a shows the deflection that occurs when the prism 63 is rotated a distance about its axis 67 but the prism 65 remains as shown in FIG. 7. The result is that the exiting light beam is displaced the distance 109 from the initial position of the light beam as shown entering prism 93. The exiting beam is, however, traveling in a direction parallel to the incident light beam. The prism 63 has moved the light beam a distance in a single direction while prism 65 has not affected the direction of the light beams since the entering light beam is normal to the upper surface.

In FIG. 7b, the lower prism has been rotated about axis 71, but the upper prism 63 remains stationary. Rotation of the lower prism causes the beam to be displaced a distance 111, but its direction again is parallel to the incident beam. In FIG. 7c, both the prisms 63 and 65 have been rotated about the respective axes, thereby moving the light beam in two directions by amounts 113 and 115. It will be noted that the system using two prisms, 63 and 65, results in each prism operating independently of the other and deflecting the light beam in a given direction. Each of the prisms 63 and 65 is made of a high quality optical material having a substantially uniform refractive index throughout so that the angle the light beam makes with the exit surface upon leaving the prism is substantially the same as the angle of incidence of the beam with respect to the entrant surface. This allows the beam to scan an areawise image, such as the image on the thermoplastic recording medium in a manner such that the beam is always perpendicular to the recording surface assuming no deformations. When deformations are present, the scanning beam is tilted with respect to its angle of incidence, with the angle of tilt or slope being proportional to the electrostatic charge caused by the original radiation being recorded. The centroid of the reflected image, compared to a reflected image from a surface known to be flat, represents slope of the surface at the point of measurement.

Surface height deformations on the order of 0.010 microns can be resolved. One can resolve a minimum diameter microscopic region, having such a height deformation, of about 10 microns. The slopes produced in the deformation media are sensitive to very low levels of actinic radiation compared to photographic film. In optically reading a deformation image, sampling of microscopic deformation regions should be at 80 micron intervals to give 4000 by 4000 pixel resolution for a 14 inch by 14 inch image.

FIG. 8 shows a non-telecentric apparatus for scanning a planar image, such as a sheet of film carrying a deformation image. The film is disposed on the upper surface 121 of the transport 123 moving in the direction indicated by the arrow A. A light source 125, such as a laser, directs a beam 127 onto a scanning mirror 129 having a scan center 131. Mirror 129 may be a small galvanometer mirror which is rocked back and forth about axis 133 in the direction indicated by the arrowheads B. The angle of inclination of the axis 133 is such that the beam 127 will scan a line pattern across the surface 121. As the deformation imaging medium 132 is advanced in the direction indicated by the arrow A the entire surface 121 will be scanned by the beam. The beam is reflected from surface 121 to a mirror 135 which is toric, having spherical curvature in two directions, over a small radius in its cross sectional plane and over a much larger radius, perpendicular to the first radius so that the scanning beam can be directed and focused onto an area detector 134 for determining the X, Y position of the beam centroid, thereby indicating the slope of a microscopic deformation zone on an image. This centroid is directly proportional to the slope of a microscopic deformation zone on the surface 121. If the angle of tilt or slope is $\theta$, then $2\theta = d/l$ where "d" is the measured centroid displacement in the optical detector relative to a flat surface and "l" is the optical path length. The angle $\theta$ is easily computed. As the beam scans in a line pattern, the mirror 135 reflects the beam to the combined mirror-detector 129. In this manner, numbers proportional to surface tilt over the entire surface may be recorded.

In FIG. 9, the toric mirror 135 may be seen to have a first radius of curvature 141 which is selected for retroreflecting light falling on the mirror and imaging the light back onto mirror-detector 129. A second radius curvature 143, lying in a plane perpendicular to the first radius of curvature, is selected to capture the beam 127 as it scans across surface 121 from edge to edge. Because of the first radius 141, light which is scattered due to deformations will be captured and retroreflected to mirror-detector 129, while light coming from surface 121 from angular sweeping of the beam will be captured by the large curvature of the mirror due to radius 143.

Telecentric and non-telecentric scanning examples have been used to show that the slopes from a plurality of microscopic regions may be detected. Corresponding electrical signals representing the surface slopes may be generated for these microscopic regions. Since there are a large number of such regions, the electrical signals over small areas may be integrated to form a picture corresponding to the slopes. In other words, the microscopic slopes may be directly converted into intensity patterns such that an image may be reconstructed. One manner of doing this is to connect adjacent points of equal slope or tilt. Such an image may be either displayed or may be plotted in the usual ways.

I claim:

1. A method of reading deformation images recorded on electrophotographic media comprising,
   scanning a deformation image on an electrophotographic medium with a radiation beam,
   detecting the optical slope from a plurality of microscopic regions,
   forming an electrical signal representing the surface slope for said plurality of microscopic regions, and integrating said electrical signal to obtain a signal representing the image intensity at said plurality of microscopic regions.

2. The method of claim 1 wherein said signal representing image intensity is converted to a digital signal.

3. The method of claim 2 further defined by storing said digital signal on an archival storage medium.

4. The method of claim 2 further defined by displaying said digital signal on a printer.

5. The method of claim 1 further defined by telecentrically scanning said reflective deformation image over an area with a laser beam.

6. The method of claim 1 further defined by displaying the integrated electrical signal.

7. A method of reading deformation images recorded on electrophotographic media comprising, scanning a deformation image recorded on an electrophotographic medium with a light beam, optically detecting the slopes of the reflected beam at a plurality of microscopic regions extending over the area of the image and producing a signal proportional to said slopes, integrating said signals from said plurality of microscopic regions to obtain a signal representing image intensity at said plurality of microscoic regions.

8. The method of claim 7 further defined by displaying the integrated signal.

9. A method of reading deformation images recorded on electrophotographic media comprising, scanning a deformation image recorded on an electrophotographic medium with a light beam, optically detecting the reflected beam slopes at a plurality of microscopic regions on the image, forming an electrical signal representing the optical slopes for said plurality of microscopic regions, integrating said electrical signal over areas about said plurality of microscopic regions, and displaying said integrated electrical signal.

10. The method of claim 9 wherein said integrated electrical signal is displayed by plotting lines of constant radiation intensity.

* * * * *